US012681467B2

(12) United States Patent
Satomi

(10) Patent No.: US 12,681,467 B2
(45) Date of Patent: Jul. 14, 2026

(54) PREDICTION SCORE CALCULATION DEVICE, PREDICTION SCORE CALCULATION METHOD, PREDICTION SCORE CALCULATION PROGRAM, AND LEARNING DEVICE

(71) Applicant: Konica Minolta, Inc., Tokyo (JP)

(72) Inventor: Shinya Satomi, Nagaokakyo (JP)

(73) Assignee: Konica Minolta, Inc., Tokyo (JP)

( * ) Notice: Subject to any disclaimer, the term of this patent is extended or adjusted under 35 U.S.C. 154(b) by 782 days.

(21) Appl. No.: 17/925,499

(22) PCT Filed: May 17, 2021

(86) PCT No.: PCT/JP2021/018616
§ 371 (c)(1),
(2) Date: Nov. 15, 2022

(87) PCT Pub. No.: WO2021/256141
PCT Pub. Date: Dec. 23, 2021

(65) Prior Publication Data
US 2023/0185290 A1 Jun. 15, 2023

(30) Foreign Application Priority Data
Jun. 16, 2020 (JP) ................................. 2020-103856

(51) Int. Cl.
*G05B 19/418* (2006.01)
*G06N 20/00* (2019.01)
*G06Q 10/0639* (2023.01)

(52) U.S. Cl.
CPC ....... *G05B 19/41875* (2013.01); *G06N 20/00* (2019.01); *G06Q 10/06393* (2013.01)

(58) Field of Classification Search
CPC ............. G06Q 10/06393; G06N 20/00; G05B 19/41875
See application file for complete search history.

(56) References Cited

U.S. PATENT DOCUMENTS 6,934,596 B2 * 8/2005 Yoshida ................. G06Q 10/00
700/109
11,630,450 B2 * 4/2023 Tokuno .............. G05B 23/0262
702/81
(Continued)

FOREIGN PATENT DOCUMENTS

CN 109074051 A 12/2018
JP 2002-287803 A 10/2002
(Continued)

OTHER PUBLICATIONS

Extended European Search Report (EESR) dated Feb. 12, 2024 for European Patent Application No. 21826493.5.
(Continued)

*Primary Examiner* — Dylan C White
(74) *Attorney, Agent, or Firm* — RANKIN, HILL & CLARK LLP

(57) ABSTRACT

When inspection data of a process inspection in a production line is input, a machine learning unit 420 of a prediction score calculation device 202 performs machine learning so as to output a prediction score of quality determination of a final inspection. In addition, a prediction score calculation unit 410 outputs a prediction score predicting the quality determination result of the final inspection from the inspection data of the process inspection using a machine learning model that has performed the machine learning. In addition, a threshold value determination unit 440 compares the prediction score calculated by the prediction score calculation unit 410 and determines a threshold value for predicting the quality determination from learning data, the prediction score, and cost data.

18 Claims, 12 Drawing Sheets

(56)          References Cited

U.S. PATENT DOCUMENTS

| | | | |
|---|---|---|---|
| 2002/0143417 | A1 | 10/2002 | Ito et al. |
| 2007/0005525 | A1 | 1/2007 | Collette, III et al. |
| 2020/0159197 | A1* | 5/2020 | Horiwaki ......... G05B 19/41875 |
| 2021/0110304 | A1* | 4/2021 | Tokunaga .......... G06Q 30/0278 |
| 2023/0401694 | A1* | 12/2023 | Lin ........................ G06T 7/001 |

FOREIGN PATENT DOCUMENTS

| | | | | |
|---|---|---|---|---|
| JP | 2006-317266 | A | 11/2006 | |
| JP | 2012-151251 | A | 8/2012 | |
| WO | 2017/168507 | A1 | 10/2017 | |
| WO | WO-2021007514 | A1 * | 1/2021 | ............. G09B 23/40 |
| WO | WO-2023140829 | A1 * | 7/2023 | ........... G06T 7/0004 |

OTHER PUBLICATIONS

Chinese Office Action (CNOA) date Nov. 5, 2024 issued for Chinese patent application No. 202180042377.1 and its English machine translation.

European Office Action (EPOA) dated Jun. 5, 2025 for European Patent Application No. 21826493.5.

International Search Report (ISR) dated Jul. 20, 2021 filed in PCT/JP2021/018616.

PCT Written Opinion of the International Searching Authority dated Jul. 20, 2021 filed in PCT/JP2021/018616.

* cited by examiner

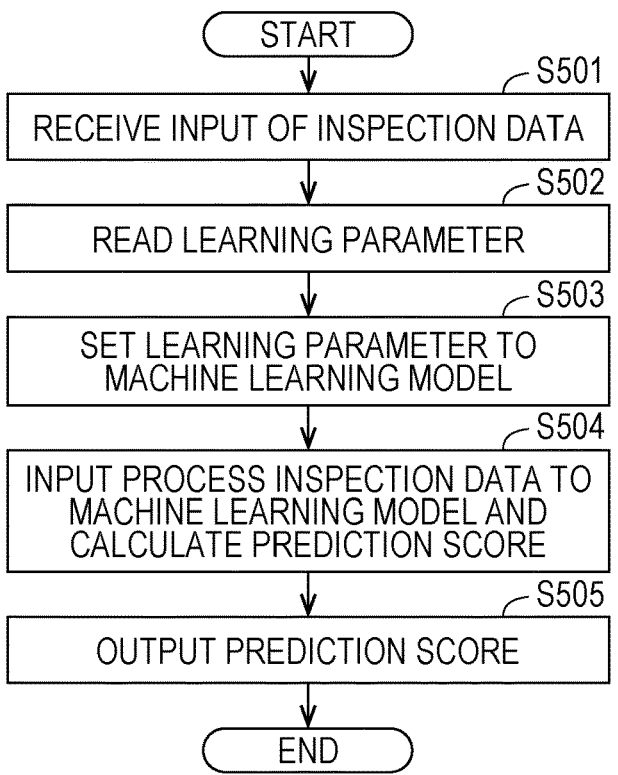

START

S501

RECEIVE INPUT OF INSPECTION DATA

S502

READ LEARNING PARAMETER

S503

SET LEARNING PARAMETER TO MACHINE LEARNING MODEL

S504

INPUT PROCESS INSPECTION DATA TO MACHINE LEARNING MODEL AND CALCULATE PREDICTION SCORE

S505

OUTPUT PREDICTION SCORE

END

*FIG. 5B*

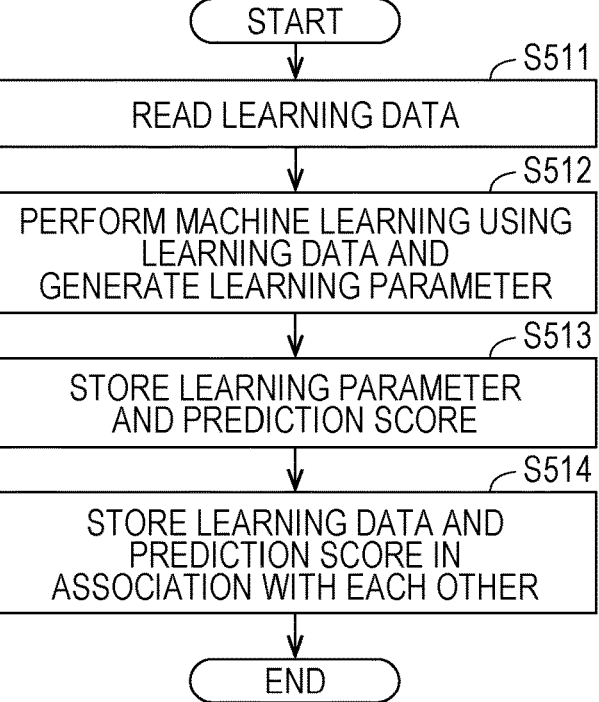

START

S511

READ LEARNING DATA

S512

PERFORM MACHINE LEARNING USING LEARNING DATA AND GENERATE LEARNING PARAMETER

S513

STORE LEARNING PARAMETER AND PREDICTION SCORE

S514

STORE LEARNING DATA AND PREDICTION SCORE IN ASSOCIATION WITH EACH OTHER

END

FIG. 6A

| PROCESS INSPECTION ITEM | PROCESS INSPECTION DATA |
|---|---|
| ITEM #1 | INSPECTION DATA #1 |
| . . . | . . . |
| ITEM #N | INSPECTION DATA #N |

FIG. 6B

| FINAL INSPECTION RESULT | FINAL INSPECTION DATA |
|---|---|

PREDICT QUALITY DETERMINATION OF FINAL INSPECTION

INPUT INSPECTION DATA

| SERIAL NUMBER | XA1043103 |
|---|---|

| PROCESS INSPECTION ITEM | PROCESS INSPECTION DATA |
|---|---|
| ITEM #1 | INSPECTION DATA #1 |
| ITEM #2 | INSPECTION DATA #2 |
| ITEM #3 | INSPECTION DATA #3 |
| ITEM #4 | INSPECTION DATA #4 |

START

PREDICTION RESULT

| PREDICTION SCORE | 0. 835971 |
|---|---|
| THRESHOLD VALUE | 0. 701433 |

| DETERMINATION RESULT | NON-DEFECTIVE |
|---|---|

END

PREDICTION SCORE CALCULATION DEVICE, PREDICTION SCORE CALCULATION METHOD, PREDICTION SCORE CALCULATION PROGRAM, AND LEARNING DEVICE

TECHNICAL FIELD

The present disclosure relates to a prediction score calculation device that predicts an inspection score in a production line from a result of another inspection preceding the inspection, a prediction score calculation method, a prediction score calculation program, and a learning device.

BACKGROUND ART

In a production line for producing an industrial product, a final inspection for determining the quality of a finished product is performed. When there is a large number of processes, a process inspection for determining the quality of an in-process product may be performed. When a defective product is found and excluded or corrected to a non-defective product in the process inspection, it is possible to reduce the loss of the raw material and the component and to save the waste of work as compared with the case where a defective product is found and excluded or corrected in the final inspection, and thus, it is possible to improve the production efficiency.

In order to appropriately perform the process inspection, it is desirable not only to carefully select inspection items to minimize excess and deficiency, but also to provide appropriate inspection criteria for each inspection item. This is because when the inspection criteria are not appropriate, a defective product is overlooked or a non-defective product is erroneously determined to be a defective product.

In view of such a problem, a technique has been proposed in which a strength of correlation between inspection data of an inspection item and a quality determination result in a final inspection is obtained for each inspection item in a process inspection, an inspection item having the strongest correlation is selected, and inspection criteria of the item are reset (see, for example, Patent Literature 1). In this way, it is possible to easily determine in a process inspection that an in-process product having a high possibility of being determined to be defective in a final inspection is defective.

Similarly, for process inspections in an upstream-downstream relationship in a production line, a technique of adjusting an upstream process inspection in accordance with a quality determination result of a downstream process inspection has been proposed (see, for example, Patent Literature 2 and 3).

CITATION LIST

Patent Literature

Patent Literature 1: JP 2006-317266 A
Patent Literature 2: JP 2012-151251 A
Patent Literature 3: WO 2017/168507 A

SUMMARY OF INVENTION

Technical Problem

However, in a case where the inspection data of each inspection item in the process inspection is not strongly correlated with the quality determination result in the final inspection, it is difficult to find, in the process inspection, an in-process product that is expected to be determined to be defective in the final inspection by using the above-described conventional technique.

Even when the inspection data of each inspection item of the process inspection is not strongly correlated with the quality determination result in the final inspection, there is a possibility that a combination of pieces of inspection data of the process inspection is correlated with the quality determination result in the final inspection, but since the number of inspection items of the process inspection is enormous, it is difficult to find how the inspection items are combined to accurately predict the quality determination result of the final inspection.

It is not realistic to select an inspection item having the strongest correlation because many work processes are required.

Needless to say, even when the inspection data of each inspection item of the process inspection is not strongly correlated with the quality determination result in the final inspection, when the score of the final inspection can be predicted in the process inspection without waiting for the final inspection, it is expected that the efficiency of the production line can be further improved by finding, excluding, or the like, in the process inspection, an in-process product that can be determined to be defective in the final inspection.

The present disclosure has been made in view of the above-described problems and an object is to provide a prediction device that can accurately predict an inspection score in a production line from a result of another inspection preceding the inspection, a prediction score calculation method, a prediction score calculation program, and a learning device.

Solution to Problem

In order to achieve the above object, a prediction score calculation device according to an aspect of the present disclosure is a prediction score calculation device that calculates a prediction score for quality determination in a second inspection process for a production process in which a product is produced through a plurality of processing processes, a first inspection process including at least one inspection process, and the second inspection process performed in a downstream process of the first inspection process, the prediction score calculation device including: an input means that receives an input of first inspection data obtained in the at least one inspection process of the first inspection process; and a calculation means that calculates the prediction score from the first inspection data input by using a machine learning model.

In this case, the input means may receive an input of inspection data of the first inspection process including a plurality of inspection processes.

In addition, it is desirable to include: a determination means that determines a threshold value of a prediction score for quality determination of an inspection target article in the first inspection process according to at least one of a profit when the inspection target article of the first inspection process constituting the inspection target article to be determined to be defective in inspection of a prediction target is determined to be defective in the first inspection process in which inspection data used for calculation of a prediction score is acquired, and a loss when the inspection target article of the first inspection process constituting the inspection target article to be determined to be non-defective in the second inspection process is determined to be defective in the first inspection process in which inspection data used for calculation of a prediction score is acquired.

In addition, the determination means preferably determines the threshold value such that a remaining cost merit obtained by subtracting the loss from the profit is maximized.

In addition, the determination means may calculate the profit and the loss by using at least one of a production cost up to the first inspection process, a member cost after the first inspection process, and a performance cost of the second inspection process.

In addition, the machine learning model may be any of gradient boosting decision tree, decision tree analysis, logistic regression, random forest, and neural network.

In addition, the machine learning model may calculate a prediction score from inspection data of the first inspection process by performing machine learning using the quality determination result of the inspection target article on which the second inspection process has been performed and the inspection data of the first inspection process related to the inspection target article of the first inspection process constituting the inspection target article as training data.

In addition, the first inspection data may include inspection data regarding a part or a function of an inspection target related to an item of the second inspection process, or may include inspection data before and after processing of the same part when using inspection data in a plurality of inspection processes. Further, the first inspection data may include measurement data of different parts when inspection data in a plurality of inspection processes is used, or may include measurement data of different physical amounts for the same part when inspection data in a plurality of inspection processes is used.

In addition, a prediction score calculation method according to an aspect of the present disclosure is a prediction score calculation method that calculates a prediction score for quality determination in a second inspection process for a production process in which a product is produced through a plurality of processing processes, a first inspection process including at least one inspection process, and the second inspection process performed in a downstream process of the first inspection process, the prediction score calculation method including: an input step of receiving an input of first inspection data obtained in the at least one inspection process of the first inspection process; and a calculation step of calculating the prediction score from the first inspection data input by using a machine learning model.

In addition, a prediction score calculation program according to an aspect of the present disclosure is a prediction score calculation program causing a computer to calculate a prediction score for quality determination in a second inspection process for a production process in which a product is produced through a plurality of processing processes, a first inspection process including at least one inspection process, and the second inspection process performed in a downstream process of the first inspection process, the prediction score calculation program causing a computer to execute: an input step of receiving an input of first inspection data obtained in the at least one inspection process of the first inspection process; and a calculation step of calculating the prediction score from the first inspection data input by using a machine learning model.

In addition, a learning device according to an aspect of the present disclosure includes: for a production process in which a product is produced through a plurality of processing processes, a first inspection process including at least one inspection process, and a second inspection process performed in a downstream process of the first inspection process, a learning data input unit that receives an input of first inspection data obtained in the at least one inspection process of the first inspection process and a quality determination result of an inspection target article on which the second inspection process has been performed; and a learning means that causes a machine learning model to learn such that the first inspection data and the quality determination result input are used as training data and a prediction score for quality determination in the second inspection process is output.

In this case, the machine learning model is desirably a gradient boosting decision tree.

Advantageous Effects of Invention

In this way, the quality determination in the inspection performed downstream in the production line can be predicted in the inspection performed upstream. When an upstream inspection target article is excluded or the like in the upstream inspection on the basis of the prediction result, the loss of the production cost can be reduced as compared with the case where the inspection target article using the upstream inspection target article is excluded or the like in the downstream inspection.

BRIEF DESCRIPTION OF DRAWINGS

FIG. 5A is a flowchart describing an operation of a prediction score calculation unit 410, and FIG. 5B is a flowchart describing an operation of a machine learning unit 420.

FIG. 6A is a table illustrating an inspection data table storing inspection data of a process inspection, and FIG. 6B is a table illustrating a quality determination result table storing a quality determination result of a final inspection.

DESCRIPTION OF EMBODIMENTS

Hereinafter, an embodiment of the prediction score calculation device, the prediction score calculation method, the prediction score calculation program, and the learning device according to the present disclosure will be described with reference to the drawings.

[1] Outline of Production Line

First, an outline of the production line in the present embodiment will be described.

Figure 1:
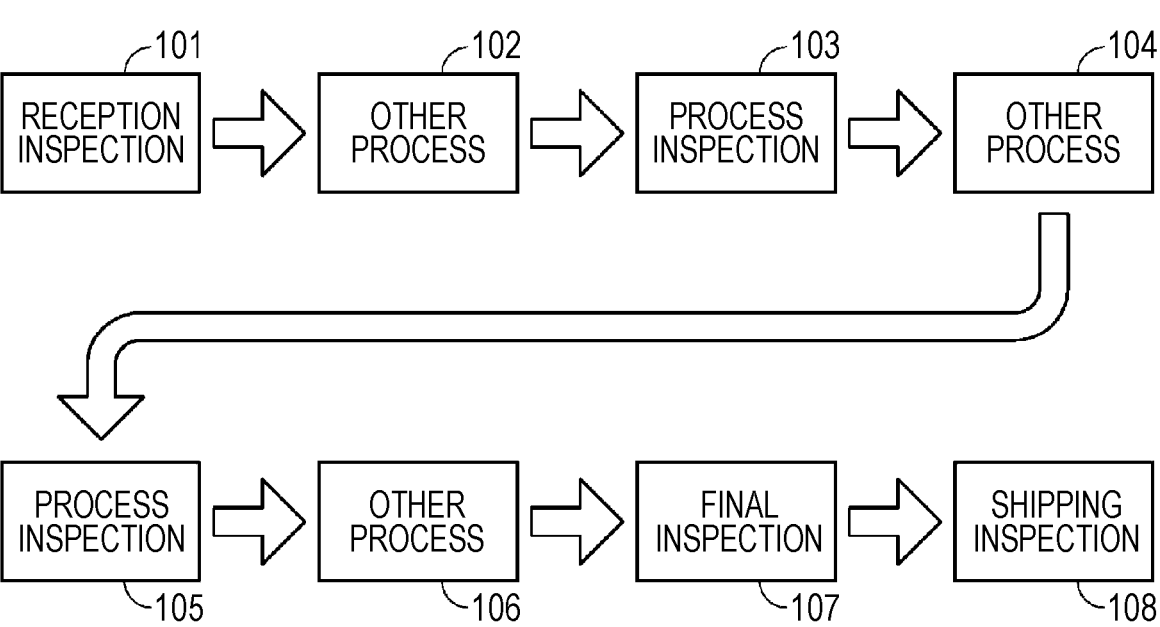
FIG. 1 is a diagram illustrating a main configuration of a production line 1 according to an embodiment of the present disclosure.

As illustrated in FIG. 1, the production line 1 is started with reception inspection 101. The reception inspection 101 is an inspection performed when raw materials and components to be used for production of a finished product are received from a client, and whether the raw materials and components, which are inspection target articles, satisfy required specifications is inspected.

Another process 102 is performed using the raw materials and components that are determined to be non-defective in the reception inspection. The other process 102 includes one or more processes such as a processing process including cutting, assembly, addition, disassembly, and the like, a process of transporting an in-process product including raw materials and components, and a standstill process such as temporary storage and the state of waiting for a next process.

A process inspection 103 is a process of performing quality determination as to whether an in-process product, which is an inspection target article, is a non-defective product or a defective product. Quantitative inspection and qualitative inspection are performed on whether inspection data of an in-process product is within an allowable range from a predetermined standard value, whether a predetermined function is exhibited, and the like. In addition, the inspection data of the process inspection 103 may be inspection data for each in-process product or inspection data in units of lots.

An in-process product determined to be defective in the process inspection 103 is excluded, or corrected so as to be determined to be non-defective in the process inspection 103. The in-process product determined to be non-defective by the correction is sent to the next process. In this way, it is possible to prevent a loss caused by sending a non-standard in-process product to the next process.

The in-process product determined to be non-defective in the process inspection 103 is sent to another process 104. Similar to the other process 102, the other process 104 also includes one or more processes such as a processing process, a transporting process, and a standstill process. After the other process 104, another process inspection 105 is performed, and a further other process 106 is performed, and a final inspection 107 is performed. Note that the number of times of process inspection in the production line 1 may be only one or three or more. Other processes are performed between the process inspections.

The final inspection 107 is an inspection performed at the final stage of the manufacturing process, and whether a finished product, which is an inspection target article, satisfies a predetermined product standard is inspected. A finished product determined to be defective in the final inspection 107 is also excluded, or corrected so as to be determined to be non-defective in the final inspection 107, similar to an in-process product determined to be defective in the process inspections 103 and 105.

Even when the finished product is determined to be non-defective in the final inspection 107, the finished product may then be deformed or scratched due to transportation or the like, or may be deteriorated over time such as discoloration, rust, or looseness of a screw before shipment. In order to prevent the product with such a problem from being shipped, a shipping inspection 108 is performed.

FIG. 1 illustrates a case where each process is sequentially performed in the production line 1, but, needless to say, the present disclosure is not limited to this, and the production line 1 may include a joining process, or the number of joining processes may be plural. In addition, in consideration of a case where a plurality of models is produced using common components, a case where common components are used for a plurality of applications even in a single model, or the like, the production line 1 may include branching processes.

In the case of producing a plurality of models using common components, a finished product is inspected in the final inspection 107 for each model. In a case where common components are used for a plurality of applications in a single model, the production line 1 is once branched and then joined, and the final inspection 107 is performed on the finished product.

[2] Prediction Screening System

Next, a prediction screening system according to the present embodiment will be described.

Figure 2:
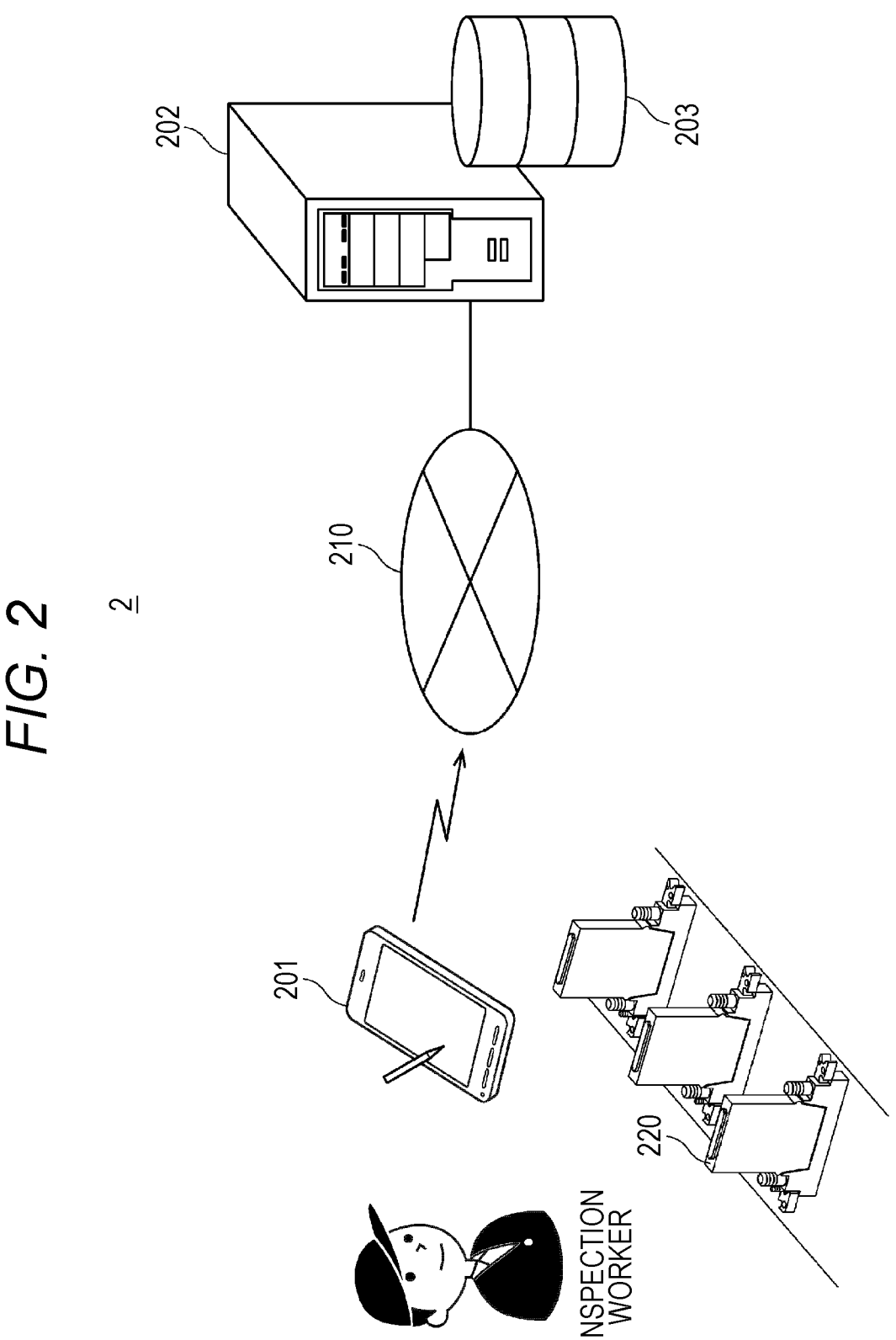
FIG. 2 is a diagram illustrating a main configuration of a prediction screening system 2 according to the present embodiment.

As illustrated in FIG. 2, the prediction screening system 2 includes the terminal device 201, the prediction score calculation device 202, and an external storage device 203, and the terminal device 201 and the prediction score calculation device 202 are connected so as to be able to communicate with each other via a communication network 210 such as a local area network (LAN) or the Internet.

The terminal device 201 is a device for an inspection worker to input inspection data that is an inspection result of the process inspections 103 and 105 and the final inspection 107 in the production line 1 of a product 220. The inspection data input to the terminal device 201 is stored in the external storage device 203 via the communication network 210. The external storage device 203 may be directly connected to the prediction score calculation device 202, and, in this case, inspection data is input from the terminal device 201 to the external storage device 203 via the prediction score calculation device 202.

In addition, the external storage device 203 may be connected to the prediction score calculation device 202 via the communication network 210. In this case, the inspection data is directly input from the terminal device 201 to the external storage device 203.

As described below, after performing the process inspection 105, the prediction score calculation device 202 calculates a prediction score for predicting the inspection result of the final inspection 107 from the inspection data of the process inspections 103 and 105 before proceeding to the other process 106. The terminal device 201 compares the prediction score calculated by the prediction score calculation device 202 with a threshold value, thereby predicting the quality determination in the final inspection 107 regarding the finished product using the in-process product inspected in the process inspections 103 and 105.

An in-process product predicted to be determined to be defective in the final inspection 107 from the inspection data of the process inspections 103 and 105 is excluded or corrected by the inspection worker, and then reinspected. On the other hand, the in-process product predicted to be determined to be non-defective in the final inspection 107 is sent to a process (the other process 106 in the production line 1) subsequent to the process inspection 105.

[3] Prediction Score Calculation Device 202

The prediction score calculation device 202 will be described in more detail.

Figure 3:
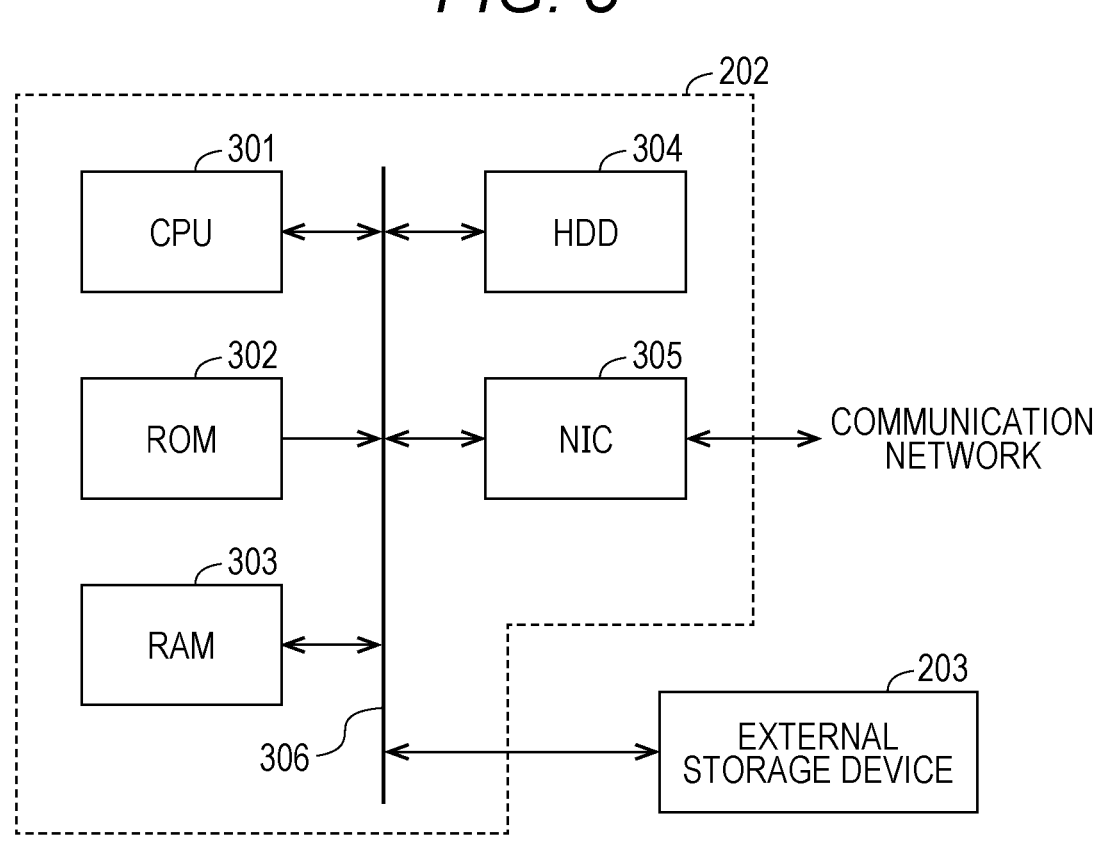
FIG. 3 is a block diagram illustrating a main configuration of a prediction score calculation device 202.

The prediction score calculation device 202 is a so-called computer, and includes a central processing unit (CPU) 301, read only memory (ROM) 302, random access memory (RAM) 303, and the like as illustrated in FIG. 3. When reset by power on or the like, the CPU 301 reads a boot program from the ROM 302 and activates, and executes an operating system (OS) and a prediction score calculation program read from a hard disk drive (HDD) 304 using the RAM 303 as a working storage area.

A network interface card (NIC) 305 executes processing for mutual communication with the terminal device 201 via the communication network 210. The CPU 301, the ROM 302, the RAM 303, the HDD 304, and the NIC 305 are connected to an internal bus 306 and communicate with each other via the internal bus 306.

When directly connected to the prediction score calculation device 202, the external storage device 203 receives access from the CPU 301 via the internal bus 306. In addition, when connected to the communication network 210, the external storage device 203 receives access from the CPU 301 via the communication network 210 and the NIC 305.

Figure 4:
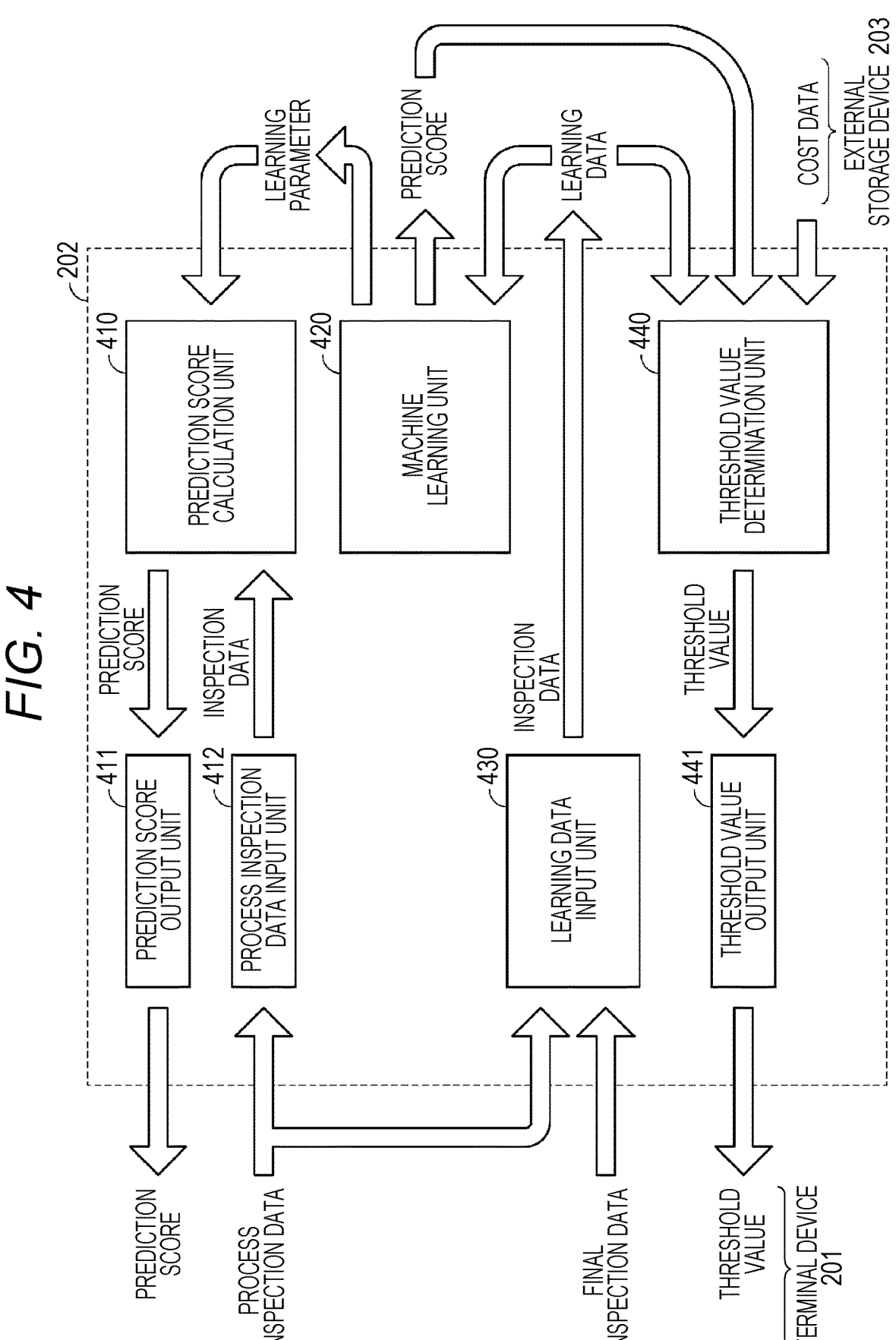
FIG. 4 is a block diagram illustrating a main functional configuration of the prediction score calculation device 202.
Figure 7:
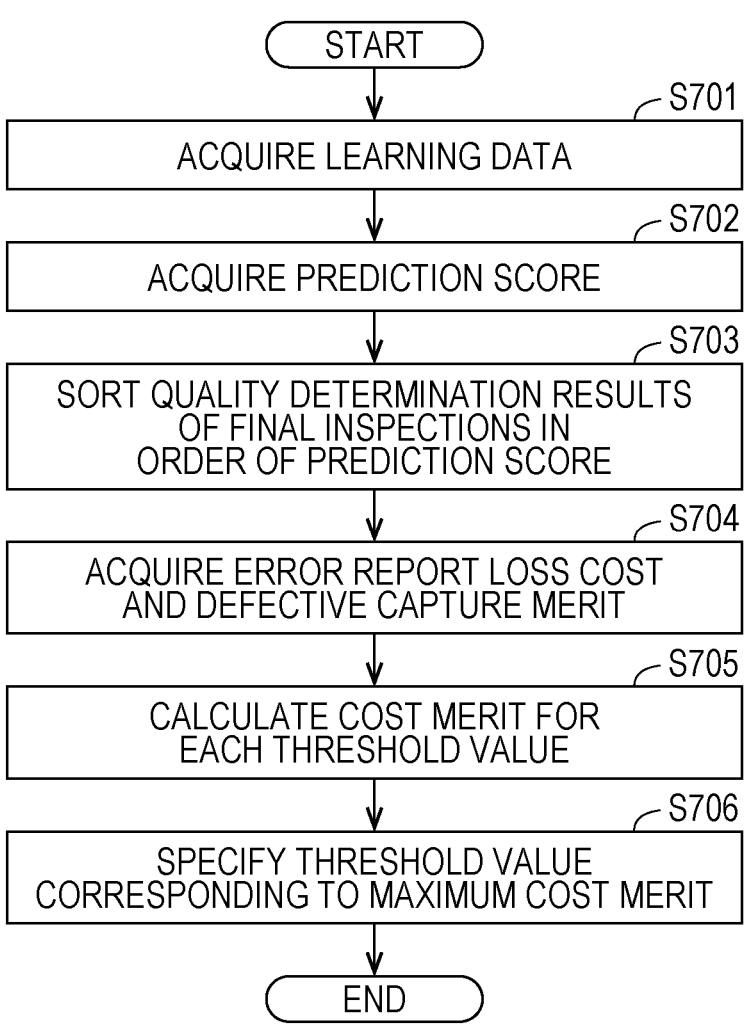
FIG. 7 is a flowchart describing an operation of a threshold value determination unit 440.

FIG. 4 is a block diagram illustrating a configuration of functions implemented by the prediction score calculation device 202 executing the prediction score calculation program. As illustrated in FIG. 4, the prediction score calculation device 202 includes the prediction score calculation unit 410, the machine learning unit 420, a learning data input unit 430, and the threshold value determination unit 440. In addition, FIGS. 5 and 7 are flowcharts describing the operation of the prediction score calculation device 202.

The prediction score calculation unit 410 operates in cooperation with a prediction score output unit 411 and a process inspection data input unit 412. The terminal device 201 inputs the inspection data of the process inspections 103 and 105 to the process inspection data input unit 412 and requests a prediction score. Thus, the process inspection data input unit 412 receives the input of the inspection data from the terminal device 201 (S501 in FIG. 5A).

The inspection data of the process inspection is input from the terminal device 201 for each combination with an identifier for identifying the inspection item of the process inspection as indicated by the inspection data table illustrated in FIG. 6A. In addition, in accordance with the inspection data, an identifier (such as a serial number of a product) of an in-process product, which is a process inspection target, is also input from the terminal device 201 to the prediction score calculation device 202.

When the process inspection data input unit 412 receives the input of the inspection data, the prediction score calculation unit 410 reads a learning parameter of a machine learning model from the external storage device 203 (S502 in FIG. 5A). The prediction score calculation unit 410 sets the learning parameter in the machine learning model (S503 in FIG. 5A).

By setting the learning parameter, the machine learning model can output the prediction score obtained by predicting the result of the quality determination of the final inspection 107 according to the inspection data of the process inspections 103 and 105. The prediction score calculation unit 410 inputs the inspection data to the machine learning model in which the learning parameter is set and calculates the prediction score (S504 in FIG. 5A).

The prediction score output unit 411 outputs the prediction score calculated by the prediction score calculation unit 410 to the terminal device 201 (S505 in FIG. 5A). The terminal device 201 compares a threshold value of the prediction score to be described below with the prediction score, and displays a predicted quality determination result of the final inspection 107. The inspection worker refers to the displayed prediction of the quality determination result and performs exclusion or the like of the in-process product.

The machine learning unit 420 executes machine learning in response to an instruction or the like from an administrator of the prediction score calculation device 202. Specifically, first, as the learning data, the inspection data of the process inspection and the quality determination result of the final inspection corresponding to the inspection data are read from the external storage device 203 (S511 in FIG. 5B). Here, the quality determination result of the final inspection is a quality determination result of the final inspection regarding the finished product produced using the in-process product, which is a process inspection target. The in-process product may be a component incorporated into a finished product, or may be a jig, a material, or the like used for producing a finished product.

In addition, the inspection data of the process inspection has a data structure similar to that of the inspection data of the process inspection input to the prediction score calculation unit 410 (FIG. 6A). In addition, similar to the inspection data of the process inspection, the quality determination result of the final inspection is also a combination of the identifier for identifying the quality determination result of the final inspection and the quality determination result of the final inspection. In the present embodiment, the value of the quality determination result is set to "1" when the finished product is determined to be non-defective in the final inspection, and the value of the quality determination result is set to "0" when the finished product is determined to be defective.

Next, using the quality determination result of the final inspection as training data, machine learning is performed such that the prediction score obtained by inputting the inspection data to the machine learning model asymptotically approaches the training data, and a learning parameter is generated (S512 in FIG. 5B). When the machine learning is completed, the generated learning parameter is stored in the external storage device 203 (S513 in FIG. 5B). In addition, the prediction score calculated using the learning parameter is stored in the external storage device 203 in association with the learning data input to the machine learning model for calculating the prediction score (S514 in FIG. 5B).

Note that, in the present embodiment, a gradient boosting decision tree is used as the machine learning model. However, it goes without saying that the present disclosure is not limited to this, and instead of the gradient boosting decision tree, a machine learning model such as decision tree analysis, logistic regression, random forest, or neural network may be used.

Since machine learning models have different features, it is desirable to cause a plurality of machine learning models to perform machine learning using learning data, then compare the accuracy of prediction scores calculated using verification data, and adopt a machine learning model most suitable for a production line, which is a target of prediction.

The learning data input unit 430 receives the inspection data of the process inspection such as the inspection data table illustrated in FIG. 6A and the quality determination result of the final inspection such as the quality determination result table illustrated in FIG. 6B from the terminal device 201 as the learning data used when the machine learning unit 420 performs the machine learning, and stores them in the external storage device 203. Note that in a case where the terminal device 201 can directly access the external storage device 203 via the communication network 210, the learning data may be directly stored in the external storage device 203 without going through the learning data input unit 430.

The threshold value determination unit 440 determines a threshold value to be used in predicting the quality determination result of the final inspection after using the prediction score. Specifically, the learning data is read from the external storage device 203 (S701 in FIG. 7) and the prediction score corresponding to the learning data is read (S702 in FIG. 7) in response to an instruction of an administrator of the prediction score calculation device 202 to perform machine learning to generate a learning parameter, a request from the terminal device 201, or the like.

Next, the quality determination results of the final inspections are sorted among the learning data corresponding to the prediction score using the prediction score as a key (S703 in FIG. 7). In the present embodiment, the prediction score also takes a value within a range of 0 or more and 1 or less, corresponding to the fact that the determination of non-defective is "1" and the determination of defective is "0" in the final inspection.

Figure 8:
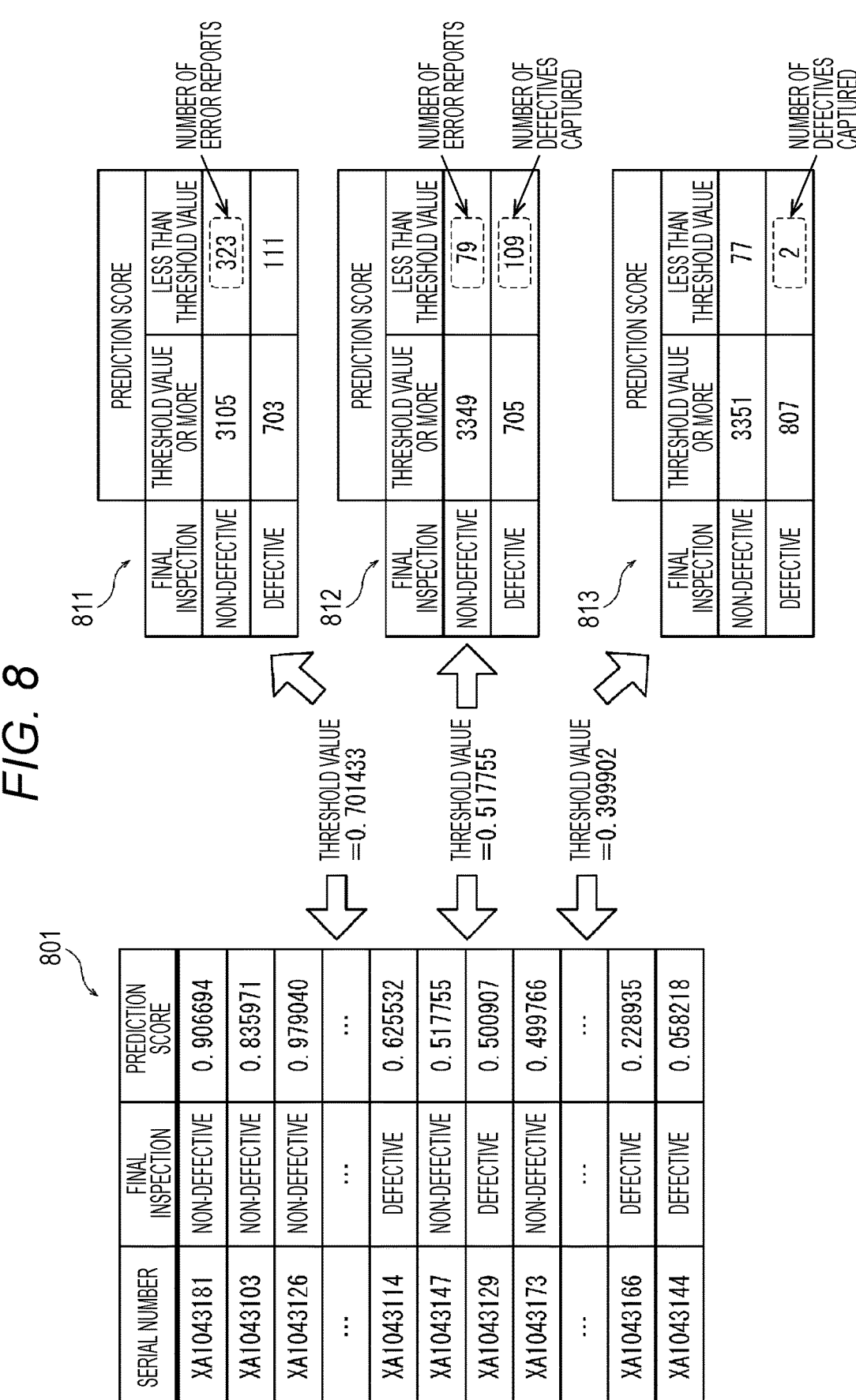
FIG. 8 is a diagram illustrating an operation of the threshold value determination unit 440 by illustrating a quality determination result of a final inspection and a prediction score corresponding to each quality determination result.

FIG. 8 is a table illustrating a sorting result. As illustrated in Table 801 of FIG. 8, the serial numbers of the in-process products, the quality determination results of the final inspection with respect to the finished products using the in-process products, and the prediction scores output from the machine learning model by inputting the inspection data of the process inspection with respect to the in-process products are sorted in descending order of the prediction scores.

In FIG. 8, the prediction score is the probability that the finished product is determined to be non-defective in the final inspection. Therefore, there is a higher probability that an in-process product having a higher prediction score is determined to be non-defective in the final inspection, and conversely, there is a higher probability that an in-process product having a lower prediction score is determined to be defective in the final inspection.

Therefore, for example, when the threshold value of the prediction score is set to a high value of 0.701433 and when it is predicted that a finished product using an in-process product having a prediction score equal to or higher than the threshold value is determined to be non-defective, as shown in Table 811, the number of in-process products with which the finished product is predicted to be erroneously determined to be defective in the final inspection among in-process products constituting the finished product determined to be non-defective in the final inspection (the number of error reports) is 323, which is excessively large. When the number of error reports is too large, although it is highly probable that the finished product using the in-process products is determined to be non-defective in the final inspection, the number of in-process products to be predicted to be defective and excluded or the like becomes too large, so that unnecessary cost is generated.

On the other hand, when the threshold value of the prediction score is set to a low value of 0.399902 and when it is predicted that a finished product using an in-process product having a prediction score equal to or higher than the threshold value is determined to be non-defective, as shown in Table 813, the number of in-process products with which the finished product is predicted to be correctly determined to be defective in the final inspection among in-process products constituting the finished product determined to be defective in the final inspection (the number of defectives captured) is 2, which is excessively small. When the number of defectives captured can be increased, it is not necessary to send the in-process products constituting the finished product having a high probability of being determined to be defective in the final inspection to the next process, so that the occurrence of unnecessary cost can be reduced.

Therefore, when the threshold value of the prediction score is set to 0.517755, which is the same as the prediction value of the serial number XA1043147, as shown in Table 812, it is possible to predict the quality determination result of the final inspection so that the number of error reports does not become too large and the number of defectives captured does not become too small.

With respect to the series of learning data used for determining the threshold value, the cost merit that can be obtained by predicting the quality determination result of the final inspection can be calculated from the number of error reports, an error report loss cost (a negative value in the present embodiment) that is a loss that can be caused by one error report, the number of defectives captured, and a defective capture merit (a positive value in the present embodiment) that is a profit that can be obtained by one defective capture by using a cost function such as Formula (1) described below.

$$\text{(Cost merit)} = \text{(number of error reports)} \times \text{(error report loss cost)} + \text{(number of defectives captured)} \times \text{(defective capture merit)} \quad (1)$$

Therefore, it is desirable that the threshold value for predicting the quality determination result of the finished product in the final inspection from the prediction score is determined so that the cost merit calculated by using the cost function of Formula (1) described above is maximized Therefore, the threshold value determination unit 440 further reads the error report loss cost and the defective capture merit from the external storage device 203 (S704 in FIG. 7), specifies the number of error reports and the number of defectives captured in order of sorted prediction scores by using the prediction score as the threshold value, and calculates the cost merit using the cost function of Formula (1) described above (S705 in FIG. 7). Thereafter, it is sufficient if a threshold value corresponding to the maximum cost merit within the calculated cost merit is specified (S706 in FIG. 7).

A threshold value output unit 441 outputs the threshold value specified by the threshold value determination unit 440 to the terminal device 201. The inspection worker operates the terminal device 201 and predicts the quality determination result in the final inspection regarding the finished product using the in-process product according to whether or not the prediction score calculated using the machine learning model from the inspection data obtained in the process inspection for each in-process product is equal to or larger than the threshold value.

When it is predicted to be determined to be non-defective in the final inspection, the in-process product is sent to the next process, and when it is predicted to be determined to be defective in the final inspection, the in-process product is excluded or corrected, such that the number of finished products determined to be defective in the final inspection can be reduced as compared with a case where the quality determination result in the final inspection is not predicted, so that the production cost of the finished product can be improved.

[4] Modifications

Although the present disclosure has been described on the basis of the embodiment, it is needless to say that the present disclosure is not limited to the above-described embodiment, and the modifications described below can be performed.

(4-1) In the above embodiment, the case where the quality determination result in the final inspection regarding the finished product using the in-process product is predicted from the inspection data of the process inspections 103 and 105 has been described as an example, but it is needless to say that the present invention is not limited to this, and those described below may be performed instead.

For example, the quality determination result in the final inspection may be predicted using only the inspection data of one of the process inspections 103 and 105, or the quality determination result in the final inspection may be predicted using inspection data of yet another process inspection in addition to the inspection data of the process inspections 103 and 105.

In a case where the quality determination result of the final inspection is predicted only from the result data of a single process inspection, the processing load for calculating the prediction score can be reduced. On the other hand, when the quality determination result of the final inspection is predicted only from the result data of a plurality of process inspections, the multilateral inspection data can be referred to, so that the accuracy of prediction of the quality determination result can be improved.

Figure 9:
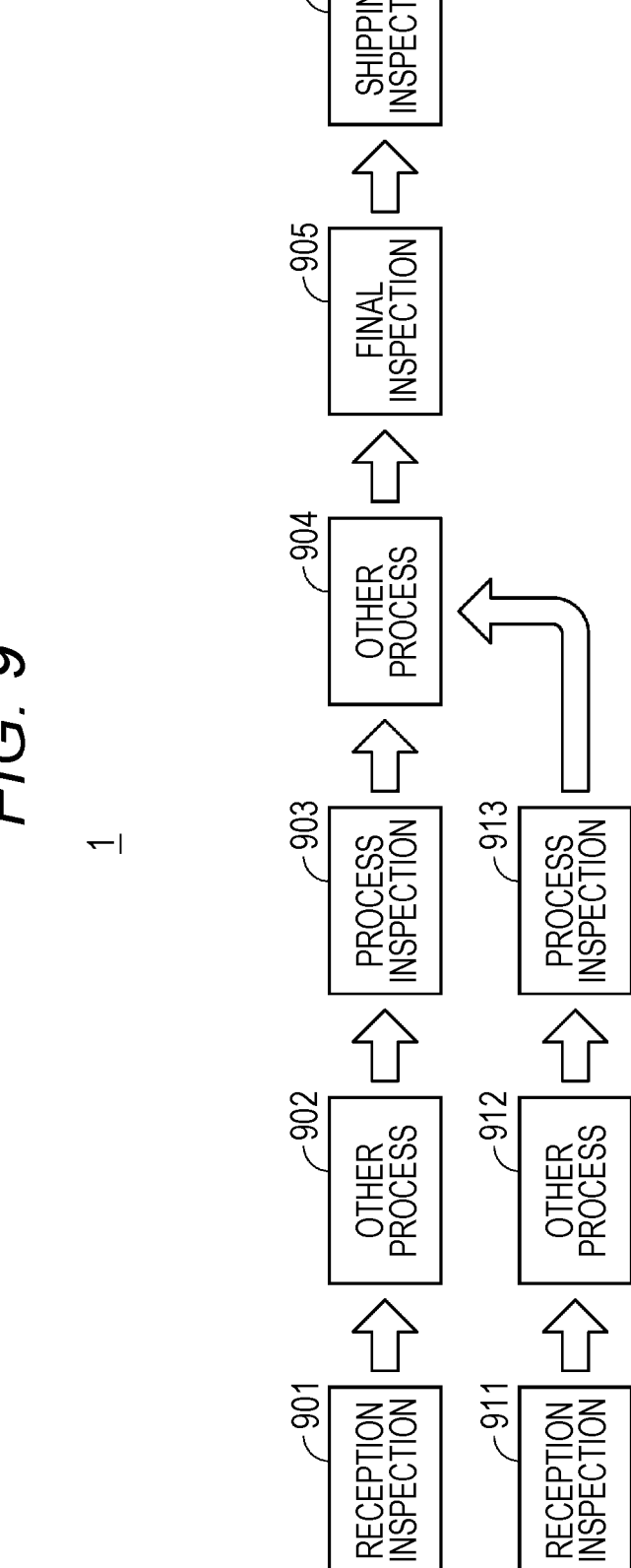
FIG. 9 is a diagram illustrating a main configuration of a production line according to a modification of the present disclosure.

In addition, as illustrated in FIG. 9, when a plurality of process inspections 903 and 913 is performed in parallel, the quality determination result of the final inspection may be predicted from their inspection data after waiting for completion of all of the plurality of process inspections 903 and 913. The prediction may be performed using the inspection data of the reception inspection in addition to the process inspections, or the prediction may be performed by combining the inspection data of the process inspections and the inspection data of the reception inspection.

In addition, it is needless to say that the prediction target is not limited to the quality determination result of the final inspection, and the inspection result of the downstream process inspection may be predicted from one or more pieces of upstream process inspection data in the production line 1. In the inspection before the unit price of the in-process product increases, when the inspection result after the unit price of the in-process product increases is predicted and the in-process product predicted to be determined to be defective is excluded or the like, the loss of production cost can be reduced as compared with the case where the in-process product determined to be defective in the inspection after the unit price of the in-process product increases is excluded or the like.

The machine learning and the prediction of the score by the machine learning model can further use the inspection data described below. For example, among the inspection data in the process inspection, inspection data regarding a part or function of the inspection target related to the item of the final inspection may be used for the machine learning of the machine learning model or the prediction of the score using the machine learning model. In the machine learning, the accuracy of the machine learning is easily improved by increasing the information diversity of the feature amount, but the accuracy of the machine learning is more easily improved by using the relevant data.

In addition, when the inspection data in a plurality of process inspections is used as the machine learning data of the machine learning model or the like, it is desirable to use the inspection data before and after processing of the same portion of the inspection target. In this way, since a change in the quality determination result of the final inspection caused by the processing can be reflected in the machine learning, it is possible to exclude the in-process product predicted to be determined to be defective due to the processing without waiting for the final inspection.

In addition, when the inspection data in a plurality of process inspections is used, measurement data for different parts of the inspection target in the process inspections may be combined and used as the inspection data. As the information diversity of the feature amount increases, the accuracy of the machine learning easily increases.

In addition, when the inspection data in a plurality of process inspections is used, measurement data of physical amounts different from each other between process inspections for the same part of the inspection target may be used in combination as the inspection data. As the information diversity of the feature amount increases, the accuracy of the machine learning easily increases.

(4-2) In the above embodiment, the case where raw inspection data obtained in the process inspection is used for predicting the quality determination result of the final inspection has been described as an example, but it is needless to say that the present disclosure is not limited to this, and the quality determination result of the final inspection may be predicted using a statistic amount that can be calculated from the raw inspection data instead of the raw inspection data or in addition to the raw inspection data.

The statistic amount such as the minimum value, the maximum value, the average value, the median value, the standard deviation, and the variance that can be calculated from the inspection data is also deeply related to each inspection data, and thus is useful in predicting the quality determination result in the final inspection.

The calculation of the statistic amount may be performed as preprocessing for the prediction score calculation device 202 to calculate the prediction score, or the terminal device 201 may execute preprocessing for calculating the statistic amount and input the obtained statistic amount to the prediction score calculation device 202 as inspection data. In addition, in the preprocessing, a feature amount other than the statistic amount may be obtained. In this way, it is not necessary to cause the machine learning to search for the feature amount or cause the machine learning model to perform the processing of calculating the feature amount, and thus, it is possible to reduce the processing load related to the machine learning model.

(4-3) Although not specifically mentioned in the above embodiment, learning and prediction using the machine learning model can be implemented by using an open source library such as LightGBM for a boosting decision tree, and scikit-learn for logistic regression, decision tree analysis, and random forest, and neural network, for example, as described below.

For example, when the boosting decision tree is used as the machine learning model, first, the inspection data of the process inspection and the final inspection is recorded in a Comma Separated Values (CSV) file, and data is read from the CSV file (for example, the file name is "inspectiondata csv") using LightGBM.

df=pd.read #csv("inspectiondata.csv", encoding='SHIFT-JIS')

Note that, in order to distinguish between the case of performing the machine learning and the case of verifying the result of the machine learning, labeling may be performed as described below.

df #train=df[df['verify']==0]

df #test=df[df['verify']==1]

Next, an explanatory variable is set.

x #train=df #train.loc[:,'inspection data #1':'inspection data #2']

x #test=df #test.loc[:,'inspection data #1':'inspection data #2']

In addition, an objective variable is set.

y #train=df #train ['pass/fail determination (fail: 1)']

y #test=df #test ['pass/fail determination (fail: 1)']

Then, the LightGBM library (boosting decision tree) is imported.

import lightgbm as lgb

Learning data is set in the LightGBM library train=lgb.Dataset(x #train, label=y #train), and data for verification is also set.

valid=train.create #valid(x #test, label=y #test)

Further, a hyperparameter is set.

```
param = [
'boosting':'gbdt',
'objective': 'binary',
'metric'/binary',
'num#iterations':20000,
'num#leaves':5,
'min#data#in#leaf':12,
'learning#rate':0.05099340688202502,
'sub#feature':0.9,
'sub#row':0.8,
'bagging#freq':1,
'lambda#11':0.054599059167475525,
'lambda#12':0.02858778312976605,
'num#threads':4,
'seed':seed # random number seed value setting
]
```

The hyperparameter is a parameter for designating a machine learning execution condition. It is sufficient if the number of learning steps to be executed, in other words, the number of decision trees is, for example, num #round=20000. After such setting, the machine learning is executed to create a machine learning model.

m #lgb=lgb.train(param, train, 20000, valid #sets=[valid], early #stopping #rounds=1500)

When performing the prediction using the created machine learning model (gradient boosting decision tree), pred #test=m #lgb.predict(x #test, num #iteration=m #lgb.best #iteration) is sufficient.

When logistic regression is used as a machine learning model, a scikit-learn library can be used. First, a package of logistic regression is imported from sklearnlinear #model import LogisticRegression, and First, an instance of a machine learning model is created lr=LogisticRegression( ), and machine learning is executed.

lr.fit(x #train, y #train)

In a case where the prediction is performed using a learned machine learning model, pred #test=lr.predict #proba(x #test)

is set.

Similarly, when decision tree analysis, random forest, and neural network are used as the machine learning model, the scikit-learn library can be used. Similarly, in the decision tree analysis, a package of the decision tree analysis is imported from sklearn.tree import DecisionTreeClassifier, an instance is created dt=DecisionTreeClassifier( ), and after executing machine learning dt.fit(x #train, y #train), the prediction is performed.

pred #test=dt.predict(x #test)

When random forest is used as the machine learning model, a package of the random forest is imported from sklearn.ensemble import RandomForestClassifier, an instance is created rf=RandomForestClassifier(random #state=777), and after executing machine learning rf.fit(x #train, y #train), the prediction is performed.

pred #test=rf.predict(x #test)

Similarly for the neural network, a package of scikit-learn is imported from sklearn.neural #network import MLPClassifier, an instance is created nn=MLPClassifier(solver="sgd", random #state=0, max #iter=10000), and after executing machine learning nn.fit(x #tmin, y #train), the prediction is performed.

pred #test=nn.predict(x #test)

(4-4) In the above embodiment, the case where the terminal device 201 compares the prediction score calculated by the prediction score calculation device 202 with the threshold value to determine the quality of the in-process product has been described as an example, but it is needless to say that the present disclosure is not limited to this, and those described below may be performed instead. For example, the prediction score calculation device 202 may compare the prediction score with the threshold value and notify the terminal device 201 of only the quality of the in-process product.

(4-5) In the above embodiment, the case where the cost merit is calculated using both the number of error reports and the number of defectives captured has been described as an example, but it is needless to say that the present disclosure is not limited to this, and the cost merit may be calculated using only one of the number of error reports and the number of defectives captured instead. In addition, it is needless to say that the cost function is not limited to Formulation (1), and the effect of the present disclosure can be obtained also when the threshold value is determined using another cost function.

(4-6) In the above embodiment, the case where the present disclosure is the prediction score calculation device 202 has been described as an example, but it is needless to say that the present disclosure is not limited to this, and the present disclosure may be a prediction score calculation method executed by the prediction score calculation device 202. In addition, it may be a prediction score calculation program causing a computer to execute the prediction score calculation method. Further, it may be a storage medium storing the prediction score calculation program, and the effect of the present disclosure can be obtained in any case.

(4-7) In the above embodiment, the present disclosure has been described mainly focusing on the configuration and operation of the prediction score calculation device 202, and therefore the description of the configuration and operation of the terminal device 201 will be supplemented here.

Figure 10:
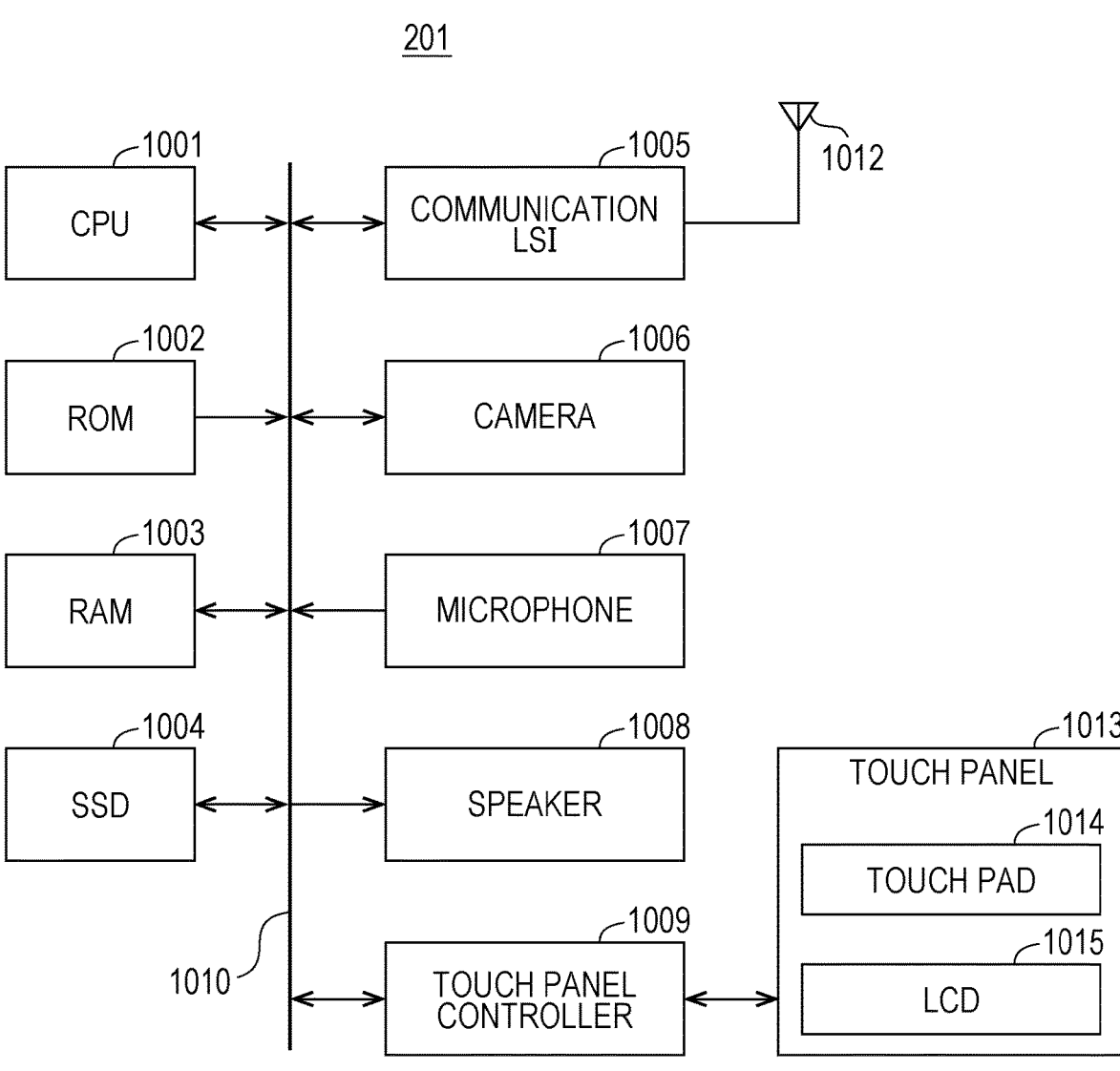
FIG. 10 is a block diagram illustrating a main hardware configuration of a terminal device 201 according to the modification of the present disclosure.

As illustrated in FIG. 10, the terminal device 201 has a configuration in which a CPU 1001, ROM 1002, RAM 1003, a solid state drive (SSD) 1004, a communication large scale integration (LSI) 1005, a camera 1006, a microphone 1007, a speaker 1008, and a touch panel controller 1009 are connected by an internal bus 1010. The CPU 1001 uses the RAM 1003 as a working storage area and executes the OS read from the SSD 1004, a prediction program for outputting a prediction result of a quality determination result of the final inspection, and the like.

A wireless communication antenna 1012 is connected to the communication LSI 1005, and communication processing such as transmission of inspection data to the prediction score calculation device 202 and reception of a prediction score is executed under the control of the CPU 1001. The touch panel controller 1009 receives a command from the CPU 1001 and controls the operation of a touch panel 1013.

The touch panel 1013 includes a touch pad 1014 and a liquid crystal display 1015, the touch pad 1014 receives input of the inspection data from the user of the terminal device 201, and the liquid crystal display 1015 presents a prediction result of the quality determination result of the final inspection to the user of the terminal device 201. The touch pad 1014 includes a touch sensor using an input method such as a capacitance method, an electromagnetic induction method, or a resistance film method, is formed of a transparent member, and is provided to overlap the liquid crystal display 1015. A light emitting diode (LED) as a light source is disposed behind the liquid crystal display 1015, and functions as a backlight of the liquid crystal display 1015.

The speaker 1008 outputs a voice, and the microphone 1007 collects the voice. The camera 1006 includes a complementary metal oxide semiconductor (CMOS) image sensor and a lens, and detects light incident from the lens with the CMOS image sensor to generate image data.

Figure 11:
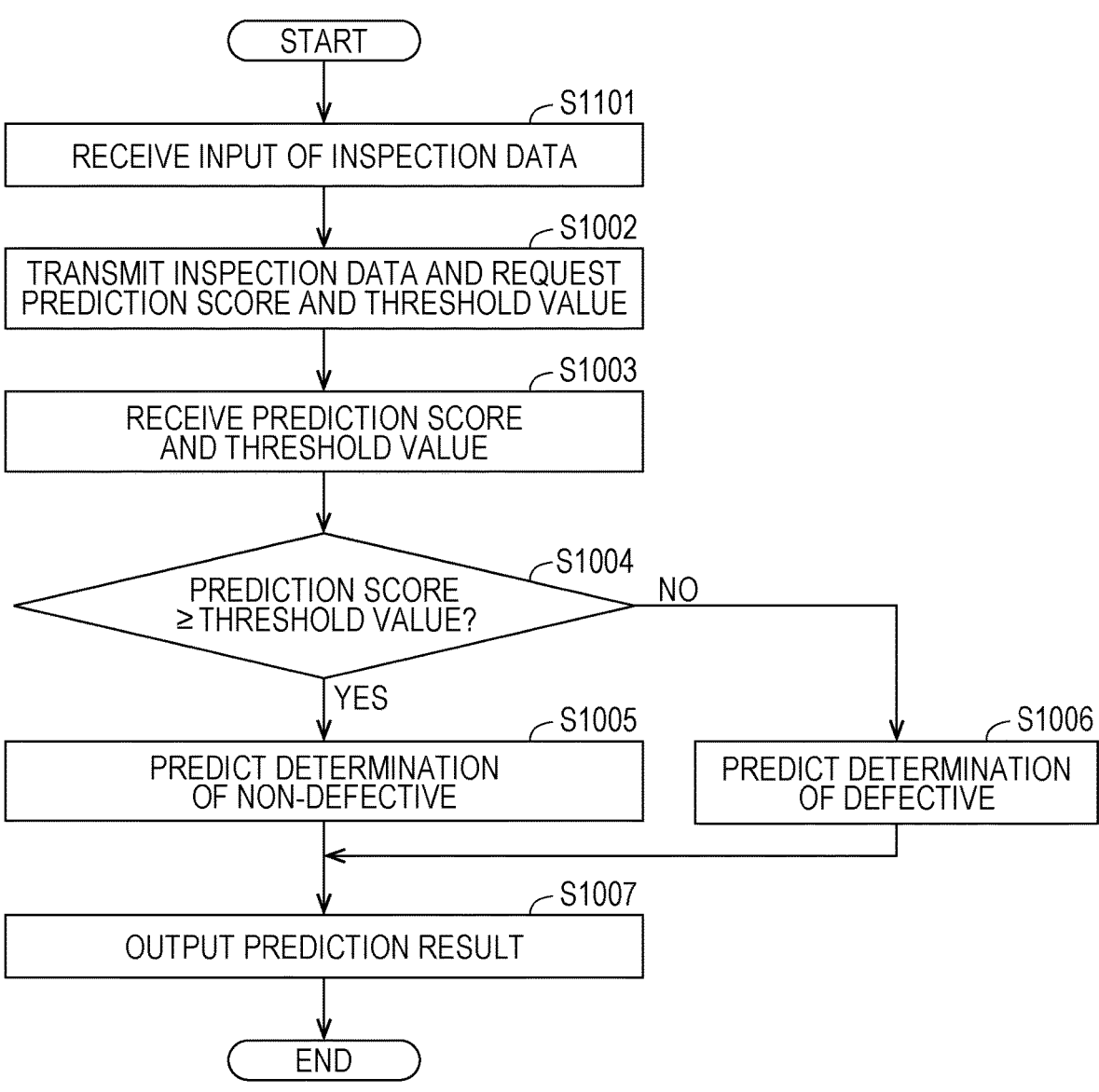
FIG. 11 is a flowchart describing processing executed by the terminal device 201 according to the modification of the present disclosure to output a prediction result of quality determination of a final inspection.

As illustrated in FIG. 11, the terminal device 201 first receives an input of the inspection data of an in-process product for which a quality determination result of the final inspection is desired to be predicted (S1101). For example, the input of the serial number of a product incorporating the in-process product for which the quality determination result of the final inspection is desired to be predicted is received in a serial number field 1202 of the display screen 1201 of the terminal device 201 as illustrated in FIG. 12, and the input of the inspection data of the in-process product in the process inspection is received in an inspection data field 1203.

When the user of the terminal device 201 completes the input of the serial number and the inspection data and touches a start button 1204, the terminal device transmits the received inspection data to the prediction score calculation device 202 and requests the prediction score and the threshold value (S1102). Thereafter, when the prediction score and the threshold value are received from the prediction score calculation device 202 (S1103), the received prediction score is compared with the threshold value.

When the prediction score is equal to or more than the threshold value (S1104: YES), it is predicted that the determination is non-defective in the final inspection (S1105). On the other hand, when the prediction score is less than the threshold value (S1104: NO), it is predicted that the determination is defective in the final inspection (S1106). Thereafter, the prediction result is displayed and output on the liquid crystal display 1015 of the touch panel 1013 (S1107), and the processing ends.

Figure 12:
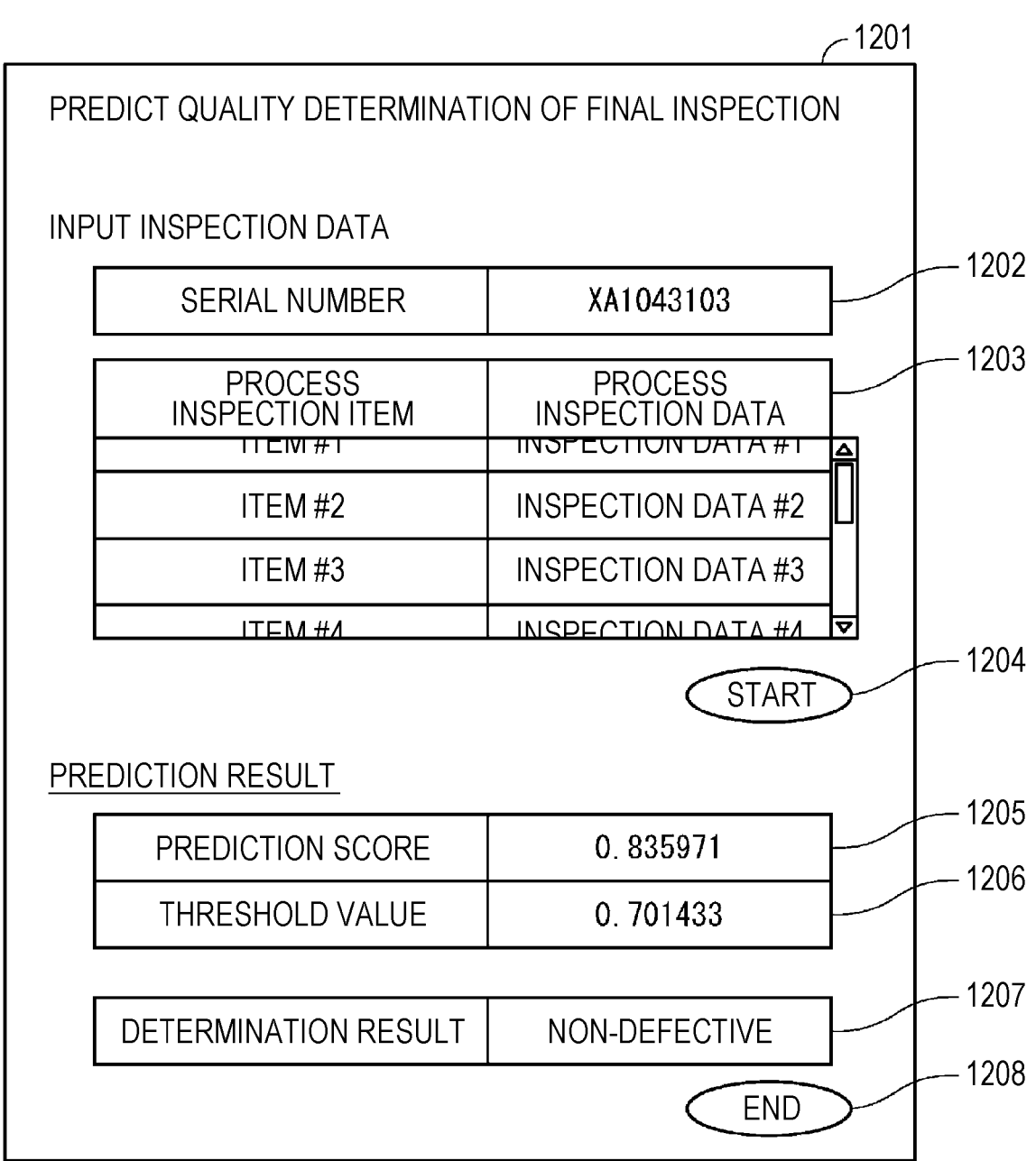
FIG. 12 is a diagram illustrating a display screen 1201 on which the terminal device 201 according to the modification of the present disclosure accepts inspection data of a process inspection and outputs a prediction result of quality determination in a final inspection.

In the example of FIG. 12, the prediction score is displayed in a prediction score field 1205, the threshold value is displayed in a threshold value field 1206, and the quality determination result of the final inspection predicted by comparing the prediction score with the threshold value is displayed in a determination result field 1207.

Note that when receiving the input of the serial number from the user, the terminal device 201 may acquire the inspection data corresponding to the serial number from the external storage device 203 or the like. In this way, it is possible to save the effort of the user who inputs the inspection data to the terminal device 201. In addition, in this case, in response to the input of the serial number, not only the inspection data is read, but also the inspection data may be transmitted to the prediction score calculation device 202 to request the prediction score and the threshold value.

In addition, only the serial number may be transmitted to the prediction score calculation device 202 to cause the prediction score calculation device 202 to acquire the inspection data corresponding to the serial number and calculate the prediction score using the inspection data.

INDUSTRIAL APPLICABILITY

The prediction score calculation device, the prediction score calculation method, the prediction score calculation program, and the learning device according to the present disclosure are useful as techniques for predicting the score of the final inspection in the production line in the process inspection.

REFERENCE SIGNS LIST

1 Production line
103, 105, 903, 905 Process inspection
107, 907 Final inspection
2 Prediction screening system
201 Terminal device
202 Prediction score calculation device
203 External storage device
410 Prediction score calculation unit
420 Machine learning unit
430 Learning data input unit
440 Threshold value determination unit

The invention claimed is:

1. A prediction score calculation device that calculates a prediction score for quality determination in a second inspection process for a production process in which a product is produced through a plurality of processing processes, a first inspection process including at least one inspection process, and the second inspection process performed in a downstream process of the first inspection process, the prediction score calculation device comprising:

an inputter that receives an input of first inspection data obtained in the at least one inspection process of the first inspection process;

a calculator that calculates the prediction score from the first inspection data input by using a machine learning model;

a prediction score output unit that outputs the prediction score to a terminal device, the product predicted to be determined to be non-defective based on the prediction score being sent to one of the plurality processing processes subsequent to the first inspection process;

a learning data inputter that receives an input of first inspection data obtained in the at least one inspection process of the first inspection process and a quality determination result of the product on which the second inspection process has been performed; and a learner causes the machine learning model to learn such that the first inspection data and the quality determination result of the product on which the second inspection process has been performed are used as training data and a prediction score for quality determination in the second inspection process is output.

2. The prediction score calculation device according to claim 1, wherein the inputter receives an input of inspection data of the first inspection process including a plurality of inspection processes.

3. The prediction score calculation device according to claim 2, comprising:

a determiner that determines a threshold value of a prediction score for quality determination of an inspection target article in the first inspection process according to at least one of a profit when the inspection target article of the first inspection process constituting the inspection target article to be determined to be defective in inspection of a prediction target is determined to be defective in the first inspection process in which inspection data used for calculation of a prediction score is acquired, and a loss when the inspection target article of the first inspection process constituting the inspection target article to be determined to be non-defective in the second inspection process is determined to be defective in the first inspection process in which inspection data used for calculation of a prediction score is acquired.

4. The prediction score calculation device according to claim 2, wherein the machine learning model is any of gradient boosting decision tree, decision tree analysis, logistic regression, random forest, and neural network.

5. The prediction score calculation device according to claim 2, wherein the machine learning model calculates a prediction score from inspection data of the first inspection process by performing machine learning using the quality determination result of the inspection target article on which the second inspection process has been performed and the inspection data of the first inspection process related to the inspection target article of the first inspection process constituting the inspection target article as training data.

6. The prediction score calculation device according to claim 2, wherein the first inspection data includes inspection data regarding a part or a function of an inspection target related to an item of the second inspection process.

7. The prediction score calculation device according to claim 2, wherein the first inspection data includes inspection data before and after processing of a same part when inspection data of a plurality of inspection processes is used.

8. The prediction score calculation device according to claim 1, comprising:

a determiner that determines a threshold value of a prediction score for quality determination of an inspection target article in the first inspection process according to at least one of a profit when the inspection target article of the first inspection process constituting the inspection target article to be determined to be defective in inspection of a prediction target is determined to be defective in the first inspection process in which inspection data used for calculation of a prediction score is acquired, and a loss when the inspection target article of the first inspection process constituting the inspection target article to be determined to be non-defective in the second inspection process is determined to be defective in the first inspection process in which inspection data used for calculation of a prediction score is acquired.

9. The prediction score calculation device according to claim 8, wherein the determiner determines the threshold value such that a remaining cost merit obtained by subtracting the loss from the profit is maximized.

10. The prediction score calculation device according to claim 8, wherein the determiner calculates the profit and the loss by using at least one of a production cost up to the first inspection process, a member cost after the first inspection process, and a performance cost of the second inspection process.

11. The prediction score calculation device according to claim 1, wherein the machine learning model is any of gradient boosting decision tree, decision tree analysis, logistic regression, random forest, and neural network.

12. The prediction score calculation device according to claim 1, wherein the machine learning model calculates a prediction score from inspection data of the first inspection process by performing machine learning using the quality determination result of the inspection target article on which the second inspection process has been performed and the inspection data of the first inspection process related to the inspection target article of the first inspection process constituting the inspection target article as training data.

13. The prediction score calculation device according to claim 1, wherein the first inspection data includes inspection data regarding a part or a function of an inspection target related to an item of the second inspection process.

14. The prediction score calculation device according to claim 1, wherein the first inspection data includes inspection data before and after processing of a same part when inspection data of a plurality of inspection processes is used.

15. The prediction score calculation device according to claim 1, wherein the first inspection data includes measurement data of different parts when inspection data of a plurality of inspection processes is used.

16. The prediction score calculation device according to claim 1, wherein the first inspection data includes measurement data of different physical amounts for a same part when inspection data of a plurality of inspection processes is used.

17. A prediction score calculation method that calculates a prediction score for quality determination in a second inspection process for a production process in which a product is produced through a plurality of processing processes, a first inspection process including at least one inspection process, and the second inspection process performed in a downstream process of the first inspection process, the prediction score calculation method comprising:

receiving an input of first inspection data obtained in the at least one inspection process of the first inspection process; and calculating the prediction score from the first inspection data input by using a machine learning model;

outputting the prediction score to a terminal device, the product predicted to be determined to be non-defective based on the prediction score being sent to one of the plurality processing processes subsequent to the first inspection process;

receiving an input of first inspection data obtained in the at least one inspection process of the first inspection process and a quality determination result of the product on which the second inspection process has been performed; and causing the machine learning model to learn such that the first inspection data and the quality determination result of the product on which the second inspection process has been performed are used as training data and a prediction score for quality determination in the second inspection process is output.

18. A non-transitory recording medium storing a computer readable prediction score calculation program causing a computer to calculate a prediction score for quality determination in a second inspection process for a production process in which a product is produced through a plurality of processing processes, a first inspection process including at least one inspection process, and the second inspection process performed in a downstream process of the first inspection process, the prediction score calculation program causing a computer to execute:

receiving an input of first inspection data obtained in the at least one inspection process of the first inspection process; and calculating the prediction score from the first inspection data input by using a machine learning model;

outputting the prediction score to a terminal device, the product predicted to be determined to be non-defective based on the prediction score being sent to one of the plurality processing processes subsequent to the first inspection process;

receiving an input of first inspection data obtained in the at least one inspection process of the first inspection process and a quality determination result of the product on which the second inspection process has been performed; and causing the machine learning model to learn such that the first inspection data and the quality determination result of the product on which the second inspection process has been performed are used as training data and a prediction score for quality determination in the second inspection process is output.

\* \* \* \* \*